INVENTOR.
RAY S. WILLIAMS
BY Gerald B. Tjoflat
ATTY.

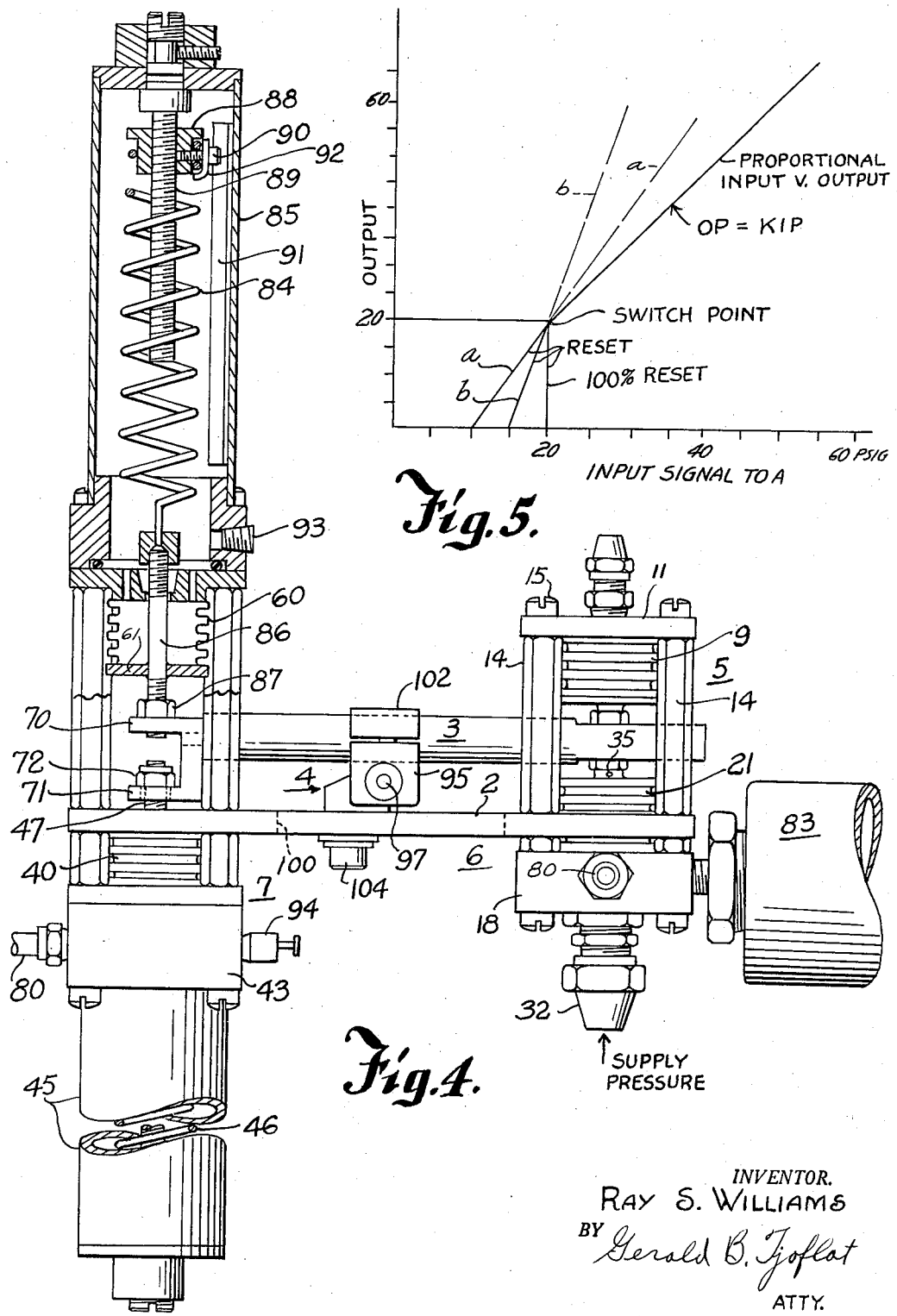

United States Patent Office

2,898,929
SEQUENTIAL RATIO TOTALIZERS

Ray S. Williams, Orrville, Ohio, assignor to Hagan Chemicals & Controls, Inc., a corporation of Pennsylvania Application May 2, 1956, Serial No. 582,285

11 Claims. (Cl. 137—85)

This invention relates to sequential ratio totalizers and more particularly to a device which is adapted to receive a signal input and develop an output that is proportional to the input over a part of the operating range of the device and reset to zero when the input signal is below a predetermined value.

An object of this invention is to provide a device having a beam with an adjustable fulcrum, input and output signal devices that exert equal and opposite forces on the beam and a switching means that is responsive to the output signal and operative to cause the device to produce an output that is linearly proportional to the input when the input signal is above a predetermined value and resets to zero when the signal input pressure is below that value.

Another object of the invention is to provide a device in accordance with the preceding object that may be so adjusted that it has 100% reset when the fulcrum is in one position and less than 100% reset when in another position.

A still further object of the invention is to provide a device as set forth in the preceding objects that may be adjustably biased so that the range of input signals required to cause the device to switch its operation from proportional relationship between input and output signals to the automatic reset may be adjusted.

The above and other objects of the invention will be apparent to those of ordinary skill of the art to which the invention pertains from the following description taken in conjunction with the accompanying drawings.

In the drawings:

Fig. 3 is a view in section taken on line III—III of Fig. 1;

Fig. 4 is a view partly in section of a modified form of the invention;

Fig. 5 is a graph showing the proportional relation between the input and output signals of the device and the point at which the device switches from proportional relation to reset;

Fig. 7 is a partial enlarged view of the output means in the device of Figs. 1 and 3.

Figure 1:
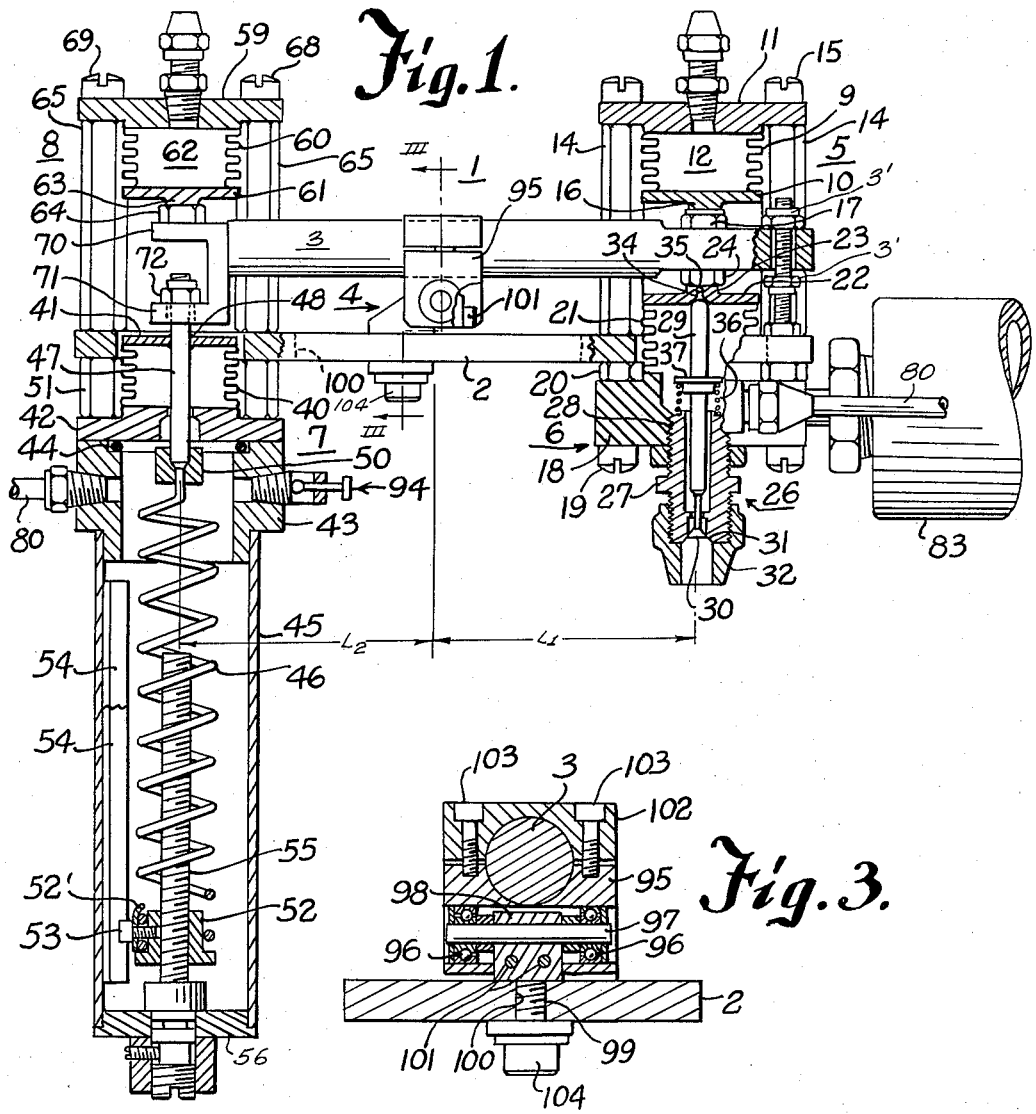
Figure 1 is a view in section of a sequential ratio totalizer arranged and constructed in accordance with an embodiment of the invention.
Figure 6:
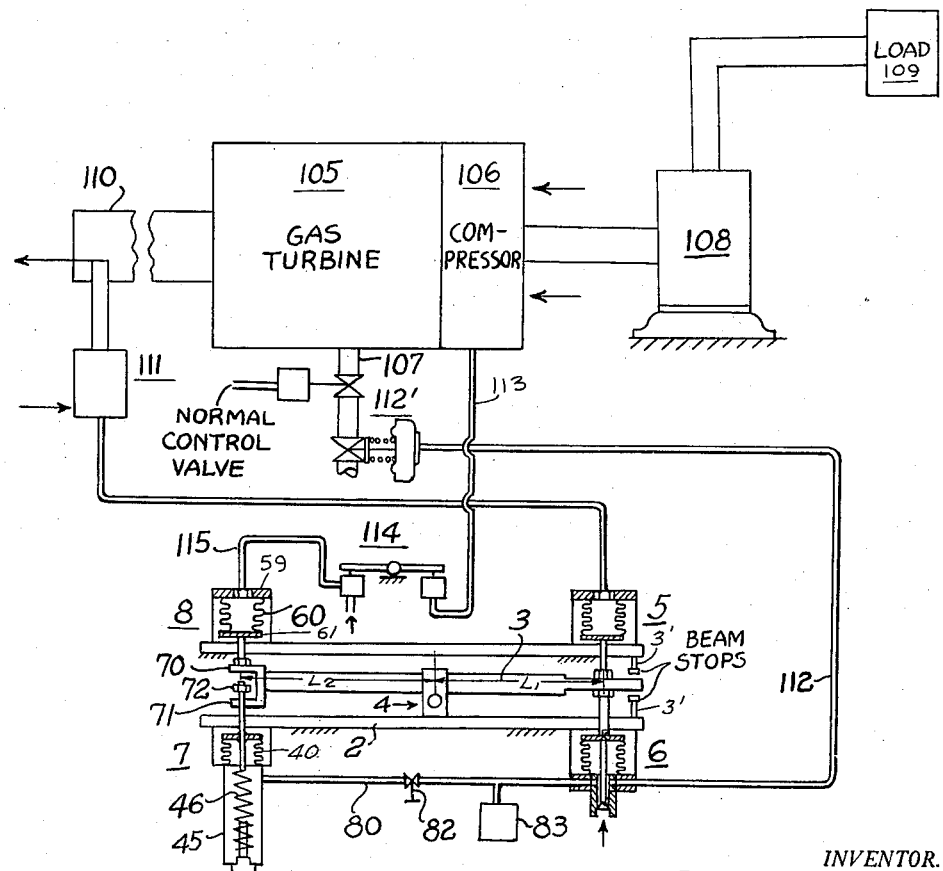
Fig. 6 is a more or less schematic view illustrating a practical adaptation of the device to the control of the fuel input to a gas turbine in accordance with temperature in the tail pipe thereof.

In Fig. 1 of the drawings a sequential ratio totalizer 1 is illustrated that comprises a relatively rigid base 2, a beam 3 mounted on a fulcrum 4 which is adjustably secured to the base 2, signal input and output means 5 and 6, a switching means 7 and a biasing means 8. Rotation of beam 3 in either direction about its fulcrum 4 may be limited by beam stops 3' as shown in Figures 1 and 6.

Input means 5 comprises a pressure deflectable member 9 such as a bellows one end of which is secured as by welding to a plate 10 and the other end to a plate 11 to provide a pressure tight chamber 12. The plate 11 is supported on spacers 14 and is secured thereto with screws 15. The plate 10 is provided with a downwardly projecting threaded boss 16 having a nut 17 thereon that engages the top side of beam 3.

The output means 6 comprises a plate 18 that is secured to the base 2 with screws 19. Adjustment nuts 20 may be placed between the plate 18 and the base 2 for the purpose of adjusting the spacing between the plate 18 and plate 2. The means 6 also includes a pressure deflectable member 21 such as a bellows, the lower and upper ends of which are secured as by welding to plate 18 and a plate 22. The plate 22 is provided with an upwardly projecting threaded boss 23 having a nut 24 thereon that bears against the underside of beam 3.

Means 6 is provided with a valve 26 that comprises a valve body 27 which is threaded into an opening 28 in the plate 18, and a valve stem 29. The valve stem is provided with a valve 30 at the lower end thereof that seats on a valve seat 31. The body is provided with a fitting 32 to which a pressure supply pipe not shown may be connected. The upper end of the valve stem is seated in an exhaust port seat 34 in the plate 22. The exhaust port 34 communicates with the atmosphere through an exhaust passage 35. The valve stem 29 is urged in a direction to seat the valve 30 on the seat 31 by means of a spring 36 disposed between a collar 37 on the stem and the inner end of the valve body 27.

When the beam 3 is in neutral position both the inlet and the exhaust ports of valve 26 are closed whereby pressure in the bellows 21 is trapped in the same. When the force acting downwardly on the beam 3 increases from a condition of equilibrium, the inlet port 31 of the valve is opened whereby pressure is admitted until the force exerted through bellows 21 by that pressure is sufficient to balance the force on the beam. At that time the inlet and exhaust ports are closed and the pressure established within the bellows 21 is again at equilibrium with the force on the beam.

When the force on beam 3 decreases from a state of equilibrium, the exhaust port 34 moves away from the end of the valve stem 29, allowing pressure to exhaust to the atmosphere until the pressure within the bellows 21 is reduced to a value at which the forces developed by the pressure in that bellows and the force acting on the beam are in balance.

The switching means 7 comprises a pressure deflectable member 40 such as a bellows the upper and lower ends of which are secured as by welding to plates 41 and 42 respectively. On the lower side of the plate 42 is a fitting 43. The joint between the fitting and the plate is sealed with means such as an O-ring 44.

A tubular housing 45 is secured to the fitting 43 as by welding. The housing is pressure tight and contains a tension spring 46. The upper end of the spring is secured to a rod or link 47 that extends upwardly through an opening in the plate 42, the bellows 40 and the plate 41, it being welded to the plate as at 48 to provide a pressure tight joint at that point. The rod 47 is provided at its lower end with a stop 50. The plate 42 is spaced from the underside of the base 2 by means of spacers 51.

The lower end of spring 46 is coupled to a nut 52 and secured in position thereon by means of a clamp 52' and screw 53. The head of the screw 53 is guided between a pair of flanges 54 so that the nut 52 will not rotate. Nut 52 is operated by an adjusting screw 55 that is journaled in a closure 56 at the bottom of the barrel 45. By turning the screw 55 in one direction or the other, the nut 52 is moved either upwardly or downwardly to adjust the tension in the spring 46.

The biasing means 8 comprises a plate 59, a bellows 60 and a plate 61. The opposite ends of the bellows are secured, as by welding, to the plates 59 and 61 to provide a pressure tight chamber 62 within the bellows. The plate 61 has a downwardly projecting threaded boss 63 having a nut 64 thereon that engages the beam 3.

The plate 59 and the bellows 60 are supported on spacers 65 at a fixed distance above the base 2. The biasing means 8 and the switching means 7 are secured firmly in relation to the base 2 by means of screws 68 and 69.

As shown in Fig. 1 the left-hand end of the beam which is operated upon by the switching means 7 and the biasing means 8 is of U-shape, having a flange 70 that is engaged by the nut 64 and a flange 71 disposed to be engaged by a nut 72 on the rod or stem 47 when the bellows 40 collapses or shortens in response to the pressure in the housing 45 decreasing below a predetermined value. So long as the pressure within the housing 45 and the bellows 40 is above a value at which the force developed by the pressure is greater than the downward force of the spring 46, the rod 47 will not exert any force on the beam through nut 72. When the pressure acting on bellows 40 is high enough to develop a force greater than the downward force of spring 46, the nut 72 will be off the beam flange 71. However, when the pressure decreases to a value at which the force developed by that pressure is less than the spring force, the nut 72 will engage the flange 71 and exert a counterclockwise tilting force on beam 3.

The force exerted by the bellows 60 on the beam 3 tends to turn it in a counterclockwise direction about the fulcrum. The force exerted by the input signal means 5 on the beam acts clockwise and the force exerted by the bellows 21 on the beam acts counterclockwise.

The biasing means 8 may be supplied with a fixed or a variable pressure or it may in some circumstances be operated without pressure. Whether the biasing means 8 is operated with or without pressure, the device can be considered as exerting a constant force on beam 3 of a magnitude that lies between zero and some maximum value or intermediate values.

Figure 2:
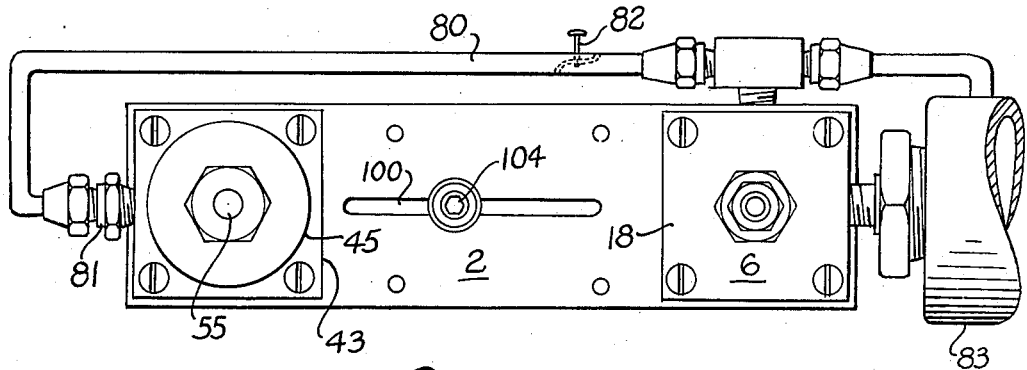
Fig. 2 is a bottom plan view of the device shown in Fig. 1.

If it be assumed that bellows 40 must develop a force of 20 pounds in order to lift the nut 72 off the beam flange 71, then it will be apparent that until that pressure is developed in the barrel 45 the device will be reset to zero because the beam 3 is then tilted counterclockwise from its neutral position. Therefore, the exhaust port 34 will be uncovered and the pressure in the bellows 21 will be reduced to atmospheric. When the signal input pressure to the means 5 increases, the force developed by bellows 9 urges beam 3 clockwise. As it is urged in that direction, the output pressure in the chamber of bellows 21 increases. That output pressure is communicated to the housing 45 and bellows 40 through a pipe 80 and a fitting 81 (see Fig. 2).

As soon as the pressure in housing 45 and bellows 40 reaches a value at which the force developed by the bellows in an upward direction is sufficient to disengage the nut 72 from the beam flange 71, the pressure output of means 6 will be equal to the signal input pressure in means 5. Therefore, from this minimum or relatively low value of pressure to the maximum output pressure of the totalizer, the relation between the input signal to the output signal will be linear. In other words, the output means 6 will merely repeat the input signal to means 5 as shown by the line OP=KIP in Fig. 5, where OP is the output pressure of means 6 and KIP is the product of a constant K and the input pressure IP to the means 5.

As the signal pressure to means 5 decreases, the output pressure of device 6 decreases until the pressure in bellows 40 reaches a point where the force developed by it is less than the downward force of spring 46. When that occurs, the nut 72 engages and exerts a downward force on the beam flange 71, whereby the exhaust port seat of the valve is uncovered, the inlet port being at that time closed. Therefore, the pressure in the output means 6 will reset to zero. If the distance from the fulcrum 4 to the line of action of bellows 9 and 21 on the beam is equal to the distance from the fulcrum to the line of action of the bellows 40 and 60 from the fulcrum, the reset will be 100%. These distances may be designated $L_1$ and $L_2$. As stated, the device has 100% reset when lever arms $L_1$ and $L_2$ are equal. If $L_1$ is greater than $L_2$, the reset will be less than 100% as shown in Fig. 5. Figure 5 illustrates the relation between the input signal and the pressure. When the input signal increases from 20 pounds p.s.i.g., for example, the output signal increases in linear relation to it. But, when the input signal decreases below 20 pounds p.s.i.g., the device resets to zero on a vertical line at $L_1$ equals $L_2$. When $L_1$ is greater than $L_2$ the device will reset at a rate less than 100% as indicated by the curves $a$ and $b$.

The point at which the device switches from the proportional input-output relationship to reset may be adjusted by means of the spring tension in spring 46 and the pressure supplied to means 8 when used. The bias pressure on the bellows 60 acts oppositely to that of the input pressure. Therefore, when there is a positive bias pressure on bellows 60, a higher input signal pressure is required to cause the device 1 to operate with linear relationship between input signal and output pressure.

The reset action of the device may also be controlled by means of a needle valve 82 in the pipe 80 that controls the rate of change of pressure in barrel 45. The reset action may be modified by means of a volume chamber 83 which is connected to the output pressure supplied to the pipe 80, as shown in Fig. 1.

In Fig. 4 a modified form of the totalizer shown in Fig. 1 is illustrated. In that view the construction is the same except that instead of relying upon a bias signal pressure being supplied to the bellows 60 a tension spring 84 is utilized. As shown, the tension spring is disposed within a housing 85 and is connected at its lower end to a rod 86 that is connected to the plate 61 of the bellows 60. The lower end of rod 86 passes through the plate 61 and is connected to the flange 70 of beam 3 by a nut 87 that is adjustably threaded on the rod 86. The upper end of the spring 84 is connected to a nut 88 that has threaded engagement with an adjustment screw 89 supported in the upper closed end of the housing 85 as shown. The nut 88 is prevented from turning when the screw 89 is turned by means of a screw 90 that operates between flanges 91 secured to the housing 86. The screw 89 also serves to secure a clamp 92 against the turns of the spring on nut 88 to thereby anchor the spring to the nut.

When the form shown in Fig. 4 is employed, the pressure inlet connection to the bellows 60 may be closed by means of a plug 93.

In both of the forms of Figs. 1 and 4, the housing 45 may be provided with a manually operable relief valve 94 for the purpose of bleeding pressure from that housing and the bellows or venting it to the atmosphere when necessary.

The fulcrum 4 as shown in section in Fig. 3, includes a bearing block 95 having ball bearing 96 mounted therein to accommodate a shaft 97. The shaft extends through a block 98 that is provided with a screw 99 that extends downwardly through an elongated slot 100 in the base 2. The bearing block 95 is secured to the block 98 by means of screws 101. The fulcrum is clamped to the beam 3 by means of a cap block 102. The cap block 102 is secured tightly to the block 95 by means of screws 103. By tightening these screws the fulcrum block and bearing black assembly are rigidly secured to the beam.

To adjust the fulcrum lengthwise of the beam 3, the screws 103 and the screw 99 are loosened, the latter by turning a clamp nut 104 so as to relieve the pressure on the plate 2. When these adjustments have been made, the fulcrum may be moved in either direction along the beam to the point desired after which it is again clamped in position.

The operation of the device as shown in Figs. 1 and 4 with reference to Fig. 5 may be understood from the following equations. If in considering Figs. 1, 4 and 5 the moments of the forces about the fulcrum 4 are equated to zero, the following equations result:

(1) $\quad P_5L_1+P_{40}L_2-P_6L_1-F_{46}L_2-P_8L_2=0$

If the area of the bellows 12 of device 5 is equal to unity then the force developed by the pressure acting on that bellows may be expressed as $P_5$. Similarly, if it be assumed that the bellows 40, 60 and 21 have unit area, then the forces as developed by them may be expressed as $P_{40}$, $P_8$ (in which bellows 62 is included) and $P_6$ in which bellows 21 is included. The force of spring 46 is $F_{46}$. The length of the lever arm at which devices 5 and 6 act on beam 3 is designated $L_1$ and the lever arm for the bellows 40 and 60 is designated $L_2$.

Solving for $P_6$ in (1), (2) $\quad P_6 = P_5\dfrac{L_1}{L_1}+P_{40}\dfrac{L_2}{L_1}-F_{46}\dfrac{L_2}{L_1}-P_8\dfrac{L_2}{L_1}$ Assuming $P_8=0$ and $F_{46}$ is equal to 20 and $L_1=L_2$, then (3) $\quad P_6=P_5+P_{40}-20$ $P_6=0$ when $P_5+P_{40}=20$; but $P_{40}$ by construction is zero until $P_5$ exceeds 20 $\therefore$ $P_6$ rises from zero to 20 at $P_5=20$. As $P_5$ increases in value above 20, $P_6$ increases linearly with it. Therefore, the portion of the curve in Fig. 5 from IP and OP=20, shows that the output pressure is linear with the input pressure and that when IP is less than 20, OP resets to 0. Therefore, the reset at $L_1=L_2$ is 100%.

If $L_1$ is greater than $L_2$ and if it be assumed for example that $L_1=1.5L_2$ then from (2) above (4) $\quad P_6=P_5+\dfrac{L_2P_{40}}{1.5L_2}-F_{46}\dfrac{L_2}{1.5L_2}-P_8\dfrac{L_2}{1.5L_2} \therefore$ (5) $\quad P_6=P_5+0.666P_{40}-0.666P_{46}-0.666P_8$ Assuming $P_8$ to be zero and $F_{46}$ to be 20 then (6) $\quad P_6=P_5+0.666P_{40}-13.32$ $P_6=0$ until $(P_5+0.666P_{40})$ just exceeds 13.32. For values of $P_5$ in excess of 13.32, $$P_6=(P_5+0.666P_{40})-13.32$$

Thus from $IP=13.32$ and $OP=0$ the curve is a straight line passing through $OP=20$ and $IP=20$.

From the foregoing equations it will be seen that the curve $OP=KIP$ and the vertical line designated 100% reset in Fig. 5 corresponds to the performance of the device when the lever arms $L_1$ and $L_2$ are equal.

The solid curve lines "a" and "b" and their extensions represent the performance of the device when the lever arms $L_1$ and $L_2$ are unequal.

An application of the totalizing device illustrated and described to this point is shown in Fig. 6. In Fig 6 there is illustrated a gas turbine 105 having a compressor 106. The compressor supplies compressed air to the turbine for supporting combustion of the fuel that is provided by a fuel supply pipe 107. The turbine may be used for driving a generator 108 that supplies a load 109 of variable magnitude. The spent gases exhaust from the turbine through a tail pipe 110.

In the operation of a gas turbine of the type generally indicated, the turbine may be overloaded in which case the tail pipe could be in danger of being overheated to the point of destruction. Therefore the totalizing device 1 is so connected to the gas supply control means of the turbine that when the temperature in the tail pipe 110 rises to the point where it is in danger of being damaged, the output signal from a thermostat 111 to the totalizer 1 begins to function. When the input signal reaches a value of say 20 pounds p.s.i.g., the output pressure of means 6 is delivered to a pipe 112 to a fuel cut back diaphragm operated valve 112' in such a manner as to reduce the fuel input. The fuel input will be held to the reduced value until the temperature in the tail pipe is restored to safe limits. As soon as the temperature in the tail pipe has been restored to safe limits, device 1 will reset its output pressure to zero the moment the input signal pressure to the means 5 reaches the switch point indicated in Fig. 5.

The device 1 may also be supplied with a loading pressure derived from the compressor 106. That loading pressure is applied to the bias means 8 through a pipe 113, a ratio relay 114. The output of ratio relay 114 is delivered through a pipe 115 to means 8. The bias thus provided by means 8 modifies the effect of the input signal to means 6 from the thermostat, in accordance with compressor pressure.

While device 1 has been shown as applied to a gas turbine for the purpose of limiting the maximum temperature in the tail pipe, it will be obvious to those skilled in the art that it has various other uses and purposes.

Having thus described the invention, it will be apparent that various modifications and changes may be made in the illustrated embodiments without departing from either the spirit or the scope of the invention. Therefore what is claimed as new and desired to be secured by Letters Patent is:

1. A device adapted to receive a variable input signal and develop an output signal which over a portion of its operating range is proportional to the input signal and over another portion of its range resets to zero, said device comprising a beam having a fulcrum between the ends thereof, a pressure signal input device having a deflectable member engaging the beam at one side of the fulcrum, a pressure output device having a deflectable member engaging the beam at a location opposite the engagement of the signal input deflectable member with the beam, a valve actuated by the beam for developing a pressure on the deflectable member of said output device, biasing means acting on the beam on the other side of the fulcrum for urging the beam in one direction about its fulcrum, and means switching said device from its operation where the input and output signals are proportional, to automatic reset and vice versa comprising a pressure receiving device having a deflectable member provided with means for engaging the beam when deflecting in one direction and disengaging the beam when deflecting in the opposite direction, means yieldingly urging said deflectable member with a fixed but adjustable force in a direction to engage the beam, and a pressure connection between said output device and the pressure receiving device of such switching means, characterized by the fact that when the input pressure is above a predetermined value the output device repeats the input pressure in proportional band manner and when the input pressure is below said value the device resets to zero.

2. A device adapted to receive a variable input signal and develop an output signal which over a portion of the range of the device is proportional to the input signal and over another portion of its range the device resets to a predetermined minimum value, comprising a beam having a fulcrum located between the ends of the beam, a pressure signal input device having a deflectable member engaging the beam at one side of the fulcrum, a pressure output device having a deflectable member engaging the beam at a location opposite the engagement of the signal input deflectable member with the beam, a valve actuated by the beam for developing a pressure on the deflectable member of said output device, and means for switching said device from its operation where the input signal and the output signal are proportional to automatic reset and vice versa, comprising a pressure receiving device having a deflectable member provided with means for engaging the beam when deflecting in one direction and disengaging the beam when deflecting in the opposite direction, means yieldingly urging said deflectable member with a fixed but adjustable force in a direction to engage the beam, and a pressure connection between said output device and the pressure receiving device of said switching means, characterized by the fact that when the input pressure is above a predetermined value the output device repeats the input pressure and when the input pressure is below said value the device resets to said predetermined minimum value.

3. A device as in claim 1 in which the fulcrum is adjustable along the length of the beam and when midway between said input and output devices and the switching and biasing means, the reset is 100% and when the fulcrum is in other than said midway position the reset is at a proportional rate less than 100%.

4. A device according to claim 2 in which the fulcrum is adjustable along the length of the beam and when midway between said input and output devices and the switching means the reset is 100% and when the fulcrum is in other than said midway position the reset is at a proportional rate less than 100%.

5. A device as in claim 1 in which the switching means comprises a tubular housing to one end of which the pressure deflectable member is attached in pressure responsive relation to the output signal, a tension spring in said housing, one end of which spring is adjustably anchored to the housing and the other end to the deflectable member, and a one-way coupling connecting the deflectable member to the beam.

6. A device according to claim 2 in which the switching means comprises a tubular housing to one end of which the pressure deflectable member is attached in pressure responsive relation to the output signal pressure, tension spring in said housing one end of which is adjustably anchored to the housing and the other end to the deflectable member, and a one-way coupling connecting the deflectable member to the beam.

7. A device as in claim 1 in which the connection between the switching means and the output device is provided with an orifice and that a ballast chamber is connected to said connection at a location between the orifice and the output device.

8. A device in accordance with claim 2 in which the connection between the switching means and the output device is provided with an orifice and that a ballast chamber is connected to said connection at a location between the orifice and the output device.

9. A device for receiving a variable input signal and developing a pneumatic output pressure that is proportional to the input signal from a predetermined low to a relatively high value of input signal and which resets from said low value to substantially zero when the input signal is below said value, comprising a beam having a fulcrum, an input device responsive to a variable signal for exerting on the beam on one side of the fulcrum a force proportional to the signal, means exerting a constant force on the beam and developing a turning force thereon that opposes that of the input signal of the input device, a device actuated by the beam for developing a pressure and exerting a force on the beam that is equal and opposite to the force of the input device when the force of the input signal exceeds said constant force, and means responsive to said output pressure and exerting a force on the beam in such direction when the output pressure and the input signal are below said predetermined value that the pressure developing device is reset to zero output pressure.

10. A device in accordance with claim 9 in which the fulcrum is adjustable in position with respect to the ends of the beam so that the reset of the device will be 100% or less than 100% as desired.

11. A device according to claim 9 in which means are provided for controlling the rate of reset.

References Cited in the file of this patent

UNITED STATES PATENTS

| | | |
|---|---|---|
| 2,285,540 | Stein | June 9, 1942 |
| 2,481,395 | Carns | Sept. 6, 1949 |
| 2,505,981 | McLeod | May 2, 1950 |
| 2,512,561 | Ziegler | June 20, 1950 |
| 2,755,813 | Farrington | July 24, 1956 |
| 2,781,770 | Sutton | Feb. 19, 1957 |
| 2,820,435 | Coar | Jan. 21, 1958 |